UNITED STATES PATENT OFFICE.

HERMANN FRIEDMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

1,023,248.     Specification of Letters Patent.     Patented Apr. 16, 1912.

No Drawing. Original application filed June 10, 1911, Serial No. 632,413. Divided and this application filed November 10, 1911. Serial No. 659,539.

*To all whom it may concern:*

Be it known that I, HERMANN FRIEDMANN, doctor of philosophy, chemist, citizen of the German Empire, residing at Elberfeld, Germany, have invented new and useful Improvements in New Vat Dye, of which the following is a specification.

The present application which is a divisional application from my application Ser. No. 632413 filed June 10, 1911, concerns the manufacture and production of new vat dyes of the anthracene series having most probably the formula:

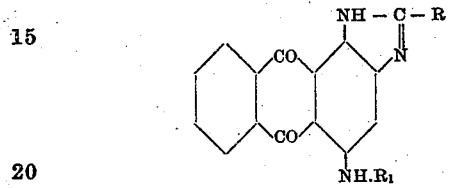

(R meaning aryl such as phenyl, tolyl, xylyl, chlorophenyl, methoxyphenyl and $R_1$ meaning acyl such as benzoyl, acetyl, methoxybenzoyl).

The new dyes can be obtained by acylizing the dyestuffs described in my application Ser. No. 632413 filed June 10, 1911 by means of acylizing agents such as acetyl chlorid, benzoyl chlorid, methoxybenzoyl chlorid. They are after being dried and pulverized yellow to orange powders soluble in pyridin, yielding red to brown vats with hydrosulfite and caustic soda lye which vats dye cotton generally from yellow to red-orange shades.

In order to illustrate the new process more fully the following example is given, the parts being by weight:—To a solution of 1 part of the product obtained by combination of 1.2.4-triaminoanthraquinone and ortho-chloro-benzaldehyde in 10 parts of nitrobenzene, 1 part of benzoyl chlorid is added and the mixture is heated to 150° C. When the reaction is finished the mixture is cooled and the separated dyestuff is filtered off and dried. The new vat dyestuff crystallizes in red needles which are soluble in concentrated sulfuric acid with a reddish-yellow coloration and yields a red-brown vat with hydrosulfite and NaOH from which cotton is dyed in a pure orange shade distinguished by its fastness to light, washing and ironing. The new dyestuff thus obtained has probably the formula:

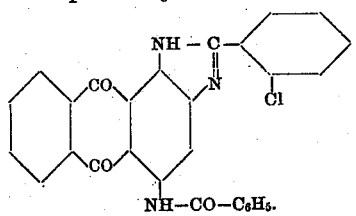

I claim:—

1. The herein described new vat dyestuffs having most probably the formula:

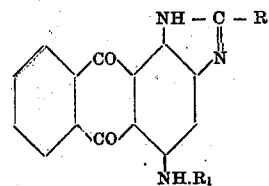

(R meaning aryl and $R_1$ meaning acyl) which are yellow to orange powders soluble in concentrated sulfuric acid with a red color; yielding a red to brown vat, which dyes cotton from yellow to red-orange shades, on saponification furnishing the intermediate products from which they were produced by acylation, substantially as described.

2. The herein described new vat dyestuff having most probably the formula:

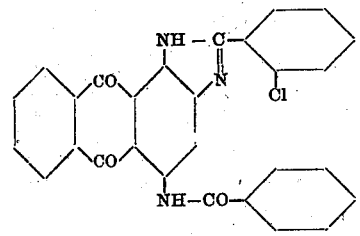

which may be obtained in red needles dissolving with a reddish-yellow coloration in concentrated sulfuric acid, yielding a red-brown vat with hydrosulfite and caustic soda lye which dyes cotton in a pure orange shade distinguished by its fastness to light, washing and ironing, substantially as described.

In testimony whereof I have hereunto set my hand in the presence of two subscribing witnesses.

HERMANN FRIEDMANN. [L. S.]

Witnesses:
 HELEN NUFER,
 A. NUFER.